United States Patent [19]

Cardini et al.

[11] Patent Number: 5,204,881
[45] Date of Patent: Apr. 20, 1993

[54] SYSTEM FOR SET-UP OF TRANSMITTERS IN HIGH CAPACITY DIGITAL RADIO LINKS

[75] Inventors: Lorenzo Cardini; GianCarlo Perego, both of Monza; Rocco Nobili, Cassina de Pechi, all of Italy

[73] Assignee: Telettra-S.p.A., Italy

[21] Appl. No.: 630,032

[22] Filed: Dec. 19, 1990

[30] Foreign Application Priority Data

Dec. 21, 1989 [IT] Italy .............................. 22771 A/89

[51] Int. Cl.⁵ ............................................ H04L 25/49
[52] U.S. Cl. ...................................... 375/60; 375/58; 455/115; 455/67.3; 330/149; 332/159
[58] Field of Search ................. 375/60, 39, 51, 58; 455/108, 114, 115, 127, 67.1, 67.3, 67.6; 332/155, 159, 160; 370/17; 330/149

[56] References Cited

U.S. PATENT DOCUMENTS

| | | | |
|---|---|---|---|
| 4,291,277 | 9/1981 | Davis et al. ........................ | 375/60 X |
| 4,462,001 | 7/1984 | Girard ................................ | 375/60 X |
| 4,890,300 | 12/1989 | Andrews ............................ | 375/60 |
| 4,890,301 | 12/1989 | Hedberg ............................ | 375/60 |
| 4,991,164 | 2/1991 | Casiraghi et al. .................. | 375/60 X |
| 4,993,021 | 2/1991 | Nannicini et al. ................. | 375/58 X |

*Primary Examiner*—Curtis Kuntz
*Assistant Examiner*—Young Tse
*Attorney, Agent, or Firm*—Ostrolenk, Faber, Gerb Soffen

[57] ABSTRACT

The invention relates to a system for initializing transmitters in high capacity digital radio links, in which a digital signal with QAM (Quadrature Amplitude Modulation) modulation is transmitted over a radio frequency carrier wave. The initialization of the transmitter is accomplished by generating a plurality of sinusoidal signals (tones), adding those tones together to simulate a digital singal to be transmitted, sending the simulated digital signal through the transmitter, and adjusting the transmitter to compensate for the intermodulation odd order products developed as a result of the nonlinearity of the power amplifier in the transmitter.

3 Claims, 3 Drawing Sheets

SYSTEM FOR SET-UP OF TRANSMITTERS IN HIGH CAPACITY DIGITAL RADIO LINKS

BACKGROUND OF THE INVENTION

1. Field of the Invention:

The present invention relates to a system for initializing transmitters used in high capacity digital radio links, in which multilevel QAM digital signals are sent over a carrier wave. The initialization is carried out by generating a plurality of sinusoidal signals (tones), adding these tones together to simulate a digital signal to be transmitted, sending the simulated digital signal through the transmitter, and adjusting the transmitter to compensate for the intermodulation odd order products developed as a result of the nonlinearity of the power amplifier in the transmitter.

2. Description of the Related Art:

Transmitter linearity is an important quality parameter in high capacity digital radio links that utilize multilevel quadrature amplitude modulation, particularly in the case where there are high number of modulation levels (e.g. 64 or 256 QAM).

The power amplifiers used in transmitters are intrinsically subject to distortion caused by nonlinearity of both even order and odd order. These latter nonlinearities are particularly dangerous because they cause intermodulation products that fall inside the transmitted digital signal band and therefore they cannot be eliminated by simple filtering.

To compensate for the effect of these amplifier nonlinearities of odd order and in particular of the third order, an I.F. (intermediate frequency) predistortion technique is often used. It generates an amplitude and phase distortion complementary to the distortion caused by the power amplifier; thus the distortion is compensated and annulled. Alignment is obtained by amplitude and phase adjustments in the predistortion circuit.

FIG. 1 shows an overall scheme of the transmitter: Predistorter 1 represents an IF linearizer formed by a predistorter for distortion compensation; $R_1$ and $R_2$ indicate the amplitude and phase adjustments of the distortion introduced by the predistorter; OL is the carrier wave generated by a local oscillator that is applied to the converter 2 to convert the IF signal of the predistorter to the transmission frequency; the power amplifier is indicated by reference numeral 3. The criterion by which the above-indicated compensation is optimized represents a very critical feature. This subject has not yet been considered by authorities generally recognized and accepted in the world.

Among the most common criteria used is the minimization of intermodulation products measured at the output of the power amplifier. FIG. 2 shows the related measure bench, in which the test signal generator 4 generates the test signal that is sent into predistorter 1, and converter 2, and power amplifier 3; FIG. 2 also shows the spectrum analyzer 5, which displays the behavior of the amplifier test signal after it has been subjected to the intermodulation distortion of the power amplifier PA.

Using this procedure, the greatest problem to solve is the selection of the test signal SP to use for optimizing the system performance. This signal must have characteristics similar to the characteristics of the digital signal. In particular, it must have analogous bandwidths, mean power and amplitude dynamics. This last parameter is very important, but up to now it hasn't been considered with sufficient attention.

A QAM signal exhibits a ratio $P_p/P_m$ ($P_p$=peak power; $P_m$=mean power) that depends on:
modulation levels number
filtering type
roll-off factor As a result of overelongations that occur in the transitions from one status to another status of the constellation that represents the geometrical locus of transmitted symbols (see FIG. 3), the instantaneous values of power obtained may be considerably greater than the mean power value.

For example, in the case of:
modulation 64 QAM
raised cosine filtering
roll-off factor=0.35
the result is:
$(P_p/P_m)dB = 8$ dB A quality test of the relationship that typically exists between input power and output power in a power amplifier (see FIG. 4) indicates that the distortion in proximity to the peak value $P_p$ differs from the distortion corresponding to lower power values. That is to say, the spectrum of the output signal and, in particular, the amplitude of intermodulation products depends on the amplitude dynamics of the same signal. Therefore, the test signal must cover the characteristics of the power amplifier 3 with an instantaneous power distributed in the same manner as the digital signal. In particular, it must have the same ratio $P_p/P_m$.

test signals presently used are:

1) DIGITAL SIGNAL:

Just the signal that must be transmitted. The spectrum analyzer 5 displays lateral lobes due to intermodulation of amplifier 3. Therefore, the compensation of such intermodulation is made minimizing the power associated to these lobes. As a result:

the amplifier 3 is charged in the actual operating condition;

it is difficult to find the desired minimum condition (just by looking at spectrum analyzer display); and the performances are generally unsatisfactory.

2) MULTITONE SIGNALS with means power equal to mean power of digital signal.

These are obtained by summing N sinusoidal signals at different frequencies, with the result that:

$P_p/P_m$ increases with the number N of tones;

the distribution of the amplitudes is uncontrollable (the time percentage during which the instantaneous amplitude approximates the peak value $P_p$ decreases when N increases);

the performances for modulation with high level number are unsatisfactory.

2a) 2 TONES with mean power equal to mean power of digital signal.

These 2 tones are obtained by summing two sinusoidal signals (tones) at different frequency, with the result that:

$P_p/P_m = 3$ dB;

performances are poor for modulation at high level number.

2b) 4 TONES with mean power equal to mean power of digital signal. These 4 tones are obtained by summing four sinusoidal signals at different frequencies, and the following characteristics occur:

$P_p/P_m = 6$ dB;

performances are optimal for 16 QAM modulations; performances for modulations with greater number of levels are unsatisfactory.

2c) 4 TONES with mean power that differs from the mean power of digital signal by [(Pp/Pm)dB−6]dB, where Pp is the peak power and Pm is the mean power of digital signal.

For this signal, the summing of four tones of different frequency results in:

good performances for modulations with high level number;

high fulfillment complexity (all transmission systems are running in automatic level control, thus keeping the mean power of transmitted signal constant vs. time). The use of such a test signal requires that the transmitter must be put in manual control, be adjusted to get the minimization of intermodulation products and then be put in operation with automatic control. Therefore, this procedure is complex and not practical.

DETAILED DESCRIPTION OF THE PREFERRED EMBODIMENT

Figure 1:
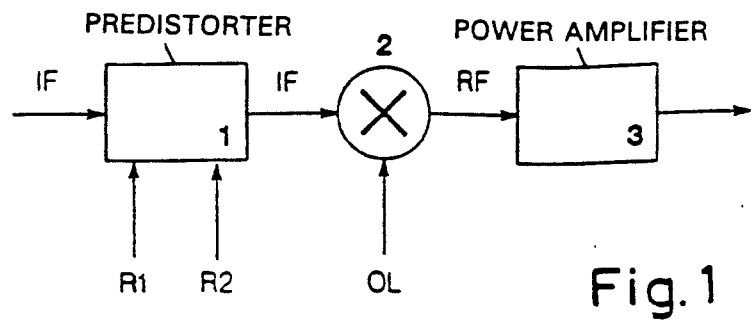
FIG. 1 is a block diagram of the transmitter used in the present invention.
Figure 2:
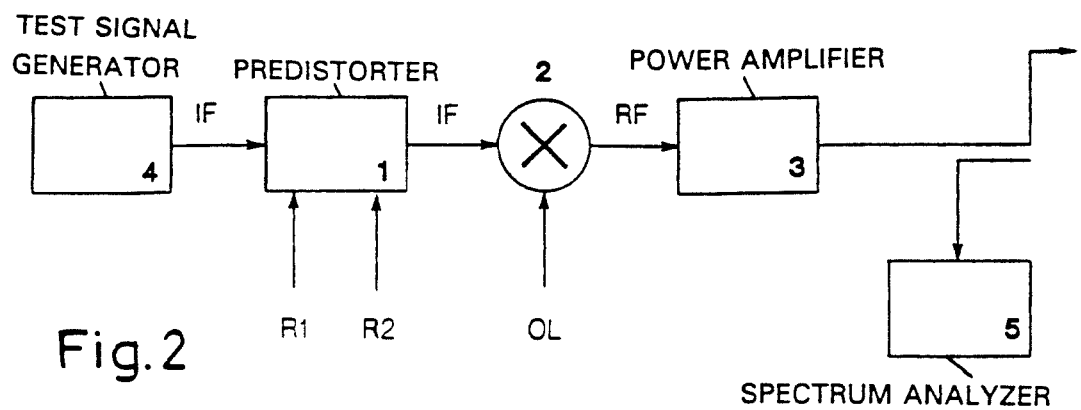
FIG. 2 is a block diagram of the transmitter and the typical circuitry used for applying a test signal to the transmitter and measuring the output.
Figure 3:
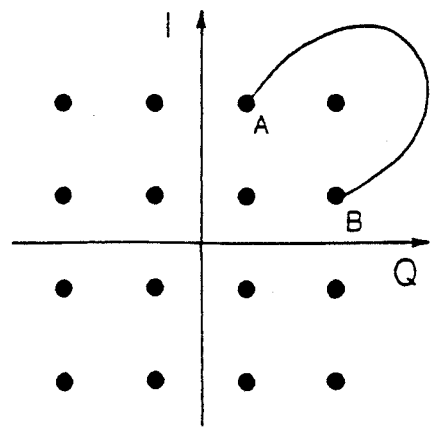
FIG. 3 is a representation of the constellation of symbols transmitted in a system with modulation 16 QAM. The arc A-B represents a possible trajectory covered by the signal in the transition A-B.
Figure 4:
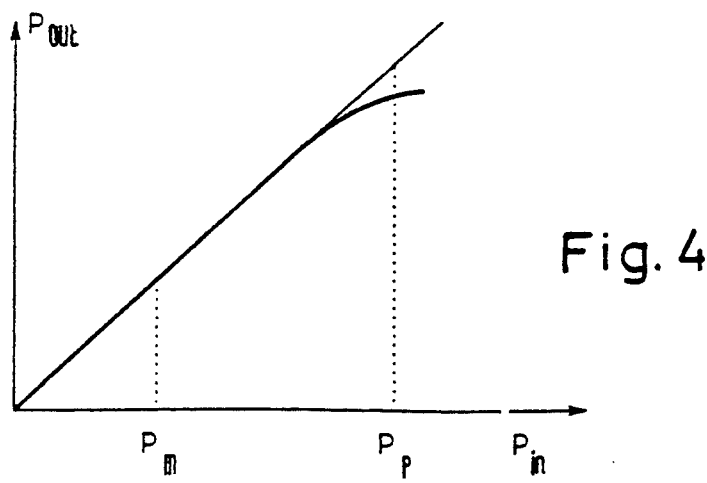
FIG. 4 is a graph showing the behavior of output power in a power amplifier.
Figure 5:
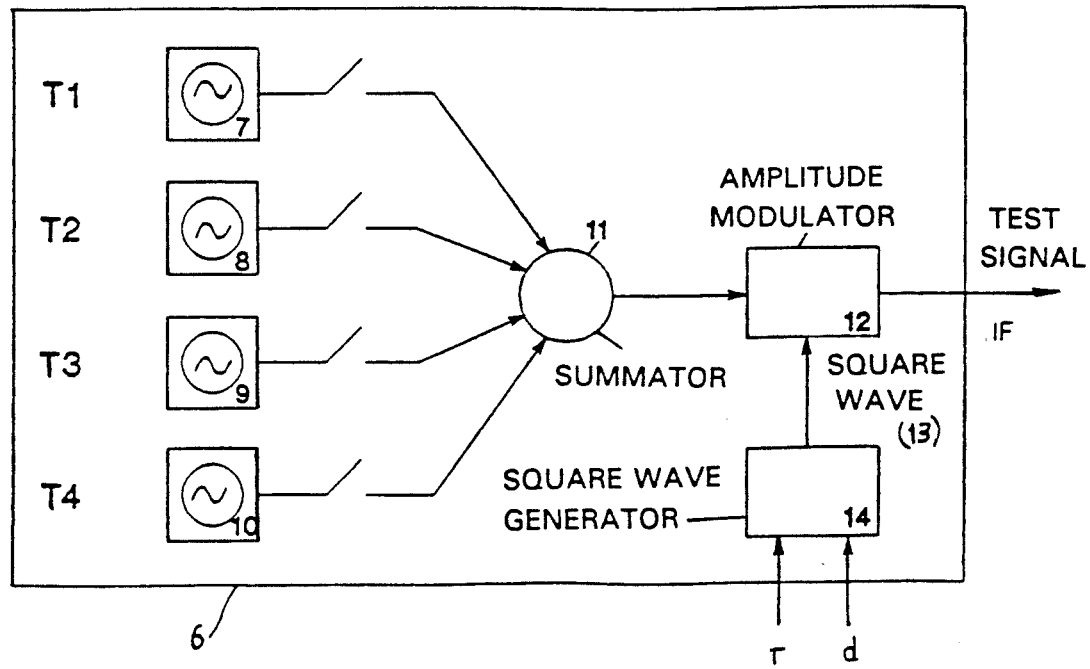
FIG. 5 is a block diagram of the generator GSPT(6) of the test signal used in the present invention.
Figure 6A:
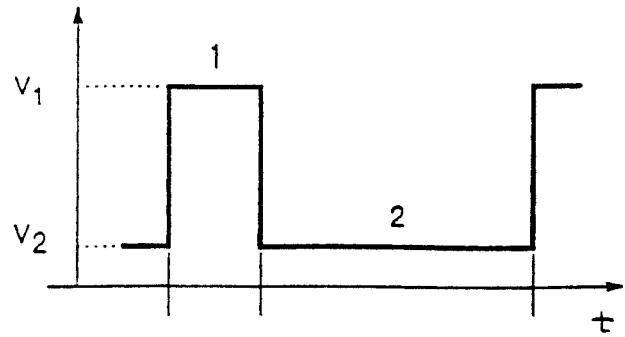
FIGS. 6a and 6b are a timing diagram showing the behavior of the modulating square wave (13) and the corresponding signal power SPT(b) versus time.
Figure 6B:
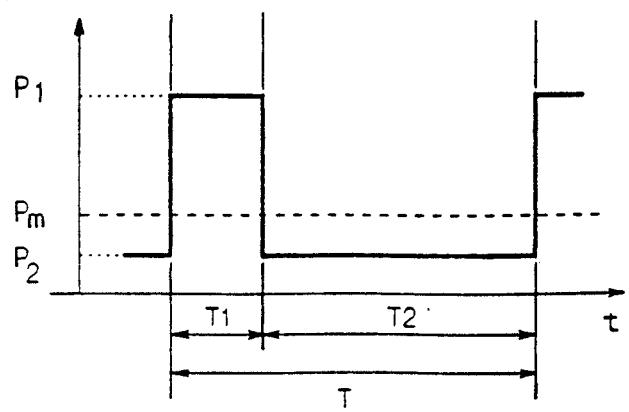

FIG. 5 shows a block scheme of the generator 6 of the test signal of the invention. The invention includes four sinusoidal oscillators 7, 8, 9, 10 operating at different frequency (but included in the field of IF) that can be cut off singularly by means of switches. The generated tones are combined in the summator 11 S and amplitude-modulator 12 in by the square wave 13 (with adjustable "duty cycle" and levels) shown in FIG. 6a and generated by the square wave generator 14. As a result of the amplitude modulation, the output power of the test signal has the behavior shown in FIG. 6b, where Pm represents the transmitted mean power and P1 and P2 indicate the mean power associated to the statuses 1 and 2 having a duration T1 and T2, respectively, of $T = T_1 + T_2$, the square wave 13 period. T is selected so that the frequency of the square wave 1/T is much less than the signal frequency $f_{IF}$ and, at the same time, sufficiently fast so that automatic level control circuits present in the transmitter do not sense the power change in jumps among statuses 1 and 2, but instead the sole mean power value Pm. Acting on the levels V1 and V2 of square wave 13, it is possible to adjust:

$r = P2/P1$ while acting on the "duty cycle" of square wave 13, it is possible to adjust:

$d = T1/T$

Therefore, considering these parameters: P mean transmitted $= (P1T1+P2T2)/T =$ $$\begin{aligned} P \text{ mean transmitted} &= (P1T1 + P2T2)/T = \\ &= [d + r(1 - d)]P1 = (1/k) \cdot P1 \\ K &= 1/[d + r(1 - d)] \end{aligned}$$

Remembering that for a signal formed by the sum of N sinusoidal uncorrelated tones:

$$\left(\frac{P\text{peak}}{P\text{ mean}}\right)_{dB} = 10 \text{Log} N = (N) \text{dB}$$

it can be assumed that the instantaneous signal peak power with N modulated tones is equal with the mean power associated to the status 1 summed with the power increase associated with the (instantaneous) combination in phase of the N tones as numerically specified above:

$(P\text{peak})\text{dBm} = (P1)\text{dBm} + (N)\text{dB}$

Finally, the result is obtained that:

$$\left(\frac{P\text{peak}}{P \text{ mean transmitted}}\right)_{dB} = (N)\text{dB} + (K)\text{dB}$$

It can be concluded that using the shown system and keeping the transmitted mean power constant, it is possible to control the dynamics of instantaneous amplitudes simply by selecting:

N r d

Using the present invention, as a result of the structure of the test signal generator 6, N can be selected to be equal to 1, 2, 3 or 4. In the case in which N=4 (for modulation at high level number, e.g. 64, 256 QAM), it results that:

$$\left(\frac{P\text{peak}}{P \text{ mean transmitted}}\right)_{dBm} = 6 \text{ dB} + (K)\text{dB}$$

Figure 7:
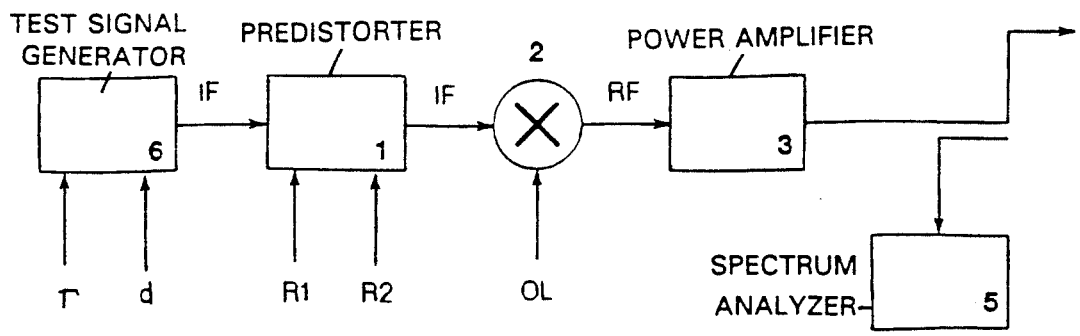
FIG. 7 is a block diagram of both the transmitter and the circuitry of the present invention for applying a test signal to the transmitter and measuring the output.

The initialization system that is claimed here can be schematized as in FIG. 7. The test wave generator is indicated by reference numeral 6. Knowing the characteristics of transmitting digital signal (levels number, filtration type, roll-off factor and then Pp/Pm), the values of r and d can be established by which the test signal simulates in a very close manner the digital signal, in particular so that they have the same ratio Pp/Pm.

This signal test signal is passed into the transmitter, and then the transmitter is optimized as a result of the adjustments R1 and R2 of the predistorter to minimize the power of intermodulation products at the output of power amplifier 3. This condition is shown on the spectrum analyzer 5 by a minimum amplitude of the corresponding spectral components.

Summarizing the main characteristics and advantages of the invention:

the test signal simulates in a real manner the instantaneous behavior of the digital signal because it can be adapted to the characteristics of the previous one;

the test signal is generated in a very simple manner;

the test signal has a mean power equal to the power of the digital signal. As the automatic level control systems distributed along the transmitter are transparent fast power changes (with reference to P1 and P2 of the FIG. 6 b), the alignment of the transmitter can be made in automatic level control mode:

as a result of the above, the claimed initialization is very simple and fast: intervention onto the transmitter aren't needed as in the case of using a multitone signal at mean power greater than the power of the digital signal;

it is very simple to find the optimal condition from

Finally, the result is obtained that:

the measure bench required by the claimed set-up requires, externally to the transmitter, the use only of a single test signal generator 6 and of a spectrum analyzer 5;

the system performances for this type of alignment are very good particularly for a high number of modulation levels.

Although the present invention has been described in connection with a preferred embodiment thereof, many other variation and modifications will now become apparent to those skilled in the art without departing from the scope of the invention. It is preferred therefore, that the present invention not be limited by the specific disclosure herein, but only by the appended claims.

We claim:

1. A method for initializing a transmitter used in a high capacity digital radio link in which multilevel QAM digital signals are sent on a carrier wave, said initializing being accomplished by:

(a) generating a test signal which simulates the digital signal to be transmitted, said test signal being generated by selectively summing four sinusoidal signals amplitude-modulated by a square wave with a variable duty cycle and amplitude, said test signal being adjusted to obtain a signal having a ratio of peak power/mean power which is equal to that of the digital signal to be transmitted, (b) sending said test signal through the transmitter, said transmitter including a power amplifier which has a nonlinear behavior and distorts signals passing therethrough, and (c) adding pre-distortion signals to the digital signals sent through the power amplifier to compensate for the distortion caused by the non-linearities in the power amplifier of the transmitter.

2. A method as recited in claim 1, wherein the adjustment of the test signal is accomplished by adjusting the amplitude and duration of the square wave so that the test signal has a ratio of peak power/mean power which is equal to that of the digital signal to be transmitted.

3. A device for initializing a transmitter used in a high capacity data link in which digital signals are sent on a carrier wave, comprising:

(a) a test signal generator for generating a test signal, said test signal generator comprising four oscillators for producing said sinusoidal signals, a summator for summing said sinusoidal signals, an amplitude modulator for modulating the summed sinusoidal signals and a square wave generator adjustable in amplitude and duration for adjusting said amplitude modulator, and (b) a pre-distorter signal generator for adding distortion to the digital signals to be transmitted which compensates for distortion introduced by a power amplifier in the transmitter.

* * * * *